United States Patent
Hasegawa et al.

(10) Patent No.: US 10,558,842 B2
(45) Date of Patent: Feb. 11, 2020

(54) IMAGE PROCESSING APPARATUS CONFIGURED TO GENERATE A TRAIL IMAGE, IMAGE PROCESSING METHOD, AND IMAGE PROCESSING SYSTEM INCLUDING THE SAME

(71) Applicant: SONY CORPORATION, Tokyo (JP)

(72) Inventors: Yutaka Hasegawa, Kanagawa (JP); Shigeatsu Yoshioka, Kanagawa (JP); Yoichi Mizutani, Saitama (JP); Naoki Tagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/412,886

(22) PCT Filed: Jul. 5, 2013

(86) PCT No.: PCT/JP2013/004184
§ 371 (c)(1),
(2) Date: Jan. 5, 2015

(87) PCT Pub. No.: WO2014/010212
PCT Pub. Date: Jan. 16, 2014

(65) Prior Publication Data
US 2015/0193648 A1 Jul. 9, 2015

(30) Foreign Application Priority Data
Jul. 13, 2012 (JP) .................. 2012-157235

(51) Int. Cl.
*G06K 9/00* (2006.01)
*G06T 11/00* (2006.01)
*G06T 11/60* (2006.01)

(52) U.S. Cl.
CPC .......... *G06K 9/00134* (2013.01); *G06T 11/60* (2013.01); *G06T 2207/10056* (2013.01);
(Continued)

(58) Field of Classification Search
None
See application file for complete search history.

(56) References Cited

U.S. PATENT DOCUMENTS 6,101,265 A * 8/2000 Bacus ................ G01N 15/1475
345/665
6,847,729 B1 1/2005 Clinch et al.
(Continued)

FOREIGN PATENT DOCUMENTS

CN 1664865 A 9/2005
CN 101238430 A 8/2008
(Continued)

OTHER PUBLICATIONS

"ABF Magnifying Tools", ABF Software, http://www.abf-soft.com/magnifying-tools/data/abfMagnifyingTools.pdf, 2000-2003.*
(Continued)

*Primary Examiner* — Matthew C Bella
*Assistant Examiner* — Brian D Shin
(74) *Attorney, Agent, or Firm* — K&L Gates LLP

(57) ABSTRACT

An image processing apparatus comprising a processor and a memory device storing instructions. When executed by the processor, the instructions cause the processor to generate a trail image according to a display time of at least one part of a pathological image in a display region.

30 Claims, 13 Drawing Sheets

(52) U.S. Cl.
CPC ............... *G06T 2207/20221* (2013.01); *G06T 2207/30096* (2013.01)

(56) References Cited

U.S. PATENT DOCUMENTS

| | | |
|---|---|---|
| 7,146,372 B2 | 12/2006 | Bacus et al. |
| 2005/0213853 A1* | 9/2005 | Maier .................... G06T 15/503 382/302 |
| 2007/0033544 A1 | 2/2007 | Fleisher et al. |
| 2009/0267955 A1* | 10/2009 | Ozawa .................... G06K 15/02 345/530 |
| 2010/0235736 A1* | 9/2010 | Fleisher ................ G06F 3/0481 715/702 |
| 2011/0060766 A1 | 3/2011 | Ehlke et al. |
| 2011/0128299 A1* | 6/2011 | Wakita ....................... G06T 1/00 345/629 |
| 2011/0129135 A1 | 6/2011 | Mizutani et al. |
| 2011/0243406 A1 | 10/2011 | Chandler |

FOREIGN PATENT DOCUMENTS

| | | |
|---|---|---|
| CN | 102081699 A | 6/2011 |
| JP | 2006-325955 | 12/2006 |
| JP | 2008-107645 | 5/2008 |
| JP | 2009-037250 | 2/2009 |
| JP | 2011-112523 | 6/2011 |
| JP | 2011-118005 | 6/2011 |
| JP | 2012-008415 | 1/2012 |

OTHER PUBLICATIONS

Tutorial: Adobe Photoshop 5.0-Layer Basics Internet Citation, XP00790. (12 pages).
Japanese Office Action in JP Application 2012157235, dated Feb. 2, 2016 (3 pages).
Chinese Office Action (with English translation) dated Aug. 31, 2016 in corresponding Chinese application No. 2013800361840 (19 pages).
Roa-Peña et al., An experimental study of pathologist's navigation patterns in virtual microscopy, Diagnostic Pathology, 2010 (11 pages).
Article 94(3) Communication dated Feb. 27, 2017 in corresponding European application No. 13739823.6 (5 pages).
Japanese Office Action dated Nov. 7, 2017 for Japanese App. No. 2016-216639 (6 pages).
Japanese Office Action dated Oct. 2, 2018 for Japanese App. No. 2018-031985 (3 pages).
Japanese Office Action dated Jul. 9, 2019 for Japanese App. No. 2018-031985 (2 pages).

* cited by examiner

| | Display history name | Recording time |
|---|---|---|
| | Record1 | 1:30 |
| | Record2 | 2:00 |
| | Record3 | 2:00 |

IMAGE PROCESSING APPARATUS CONFIGURED TO GENERATE A TRAIL IMAGE, IMAGE PROCESSING METHOD, AND IMAGE PROCESSING SYSTEM INCLUDING THE SAME

CROSS REFERENCES TO RELATED APPLICATIONS

The present application is a national stage of International Application No. PCT/JP2013/004184 filed on Jul. 5, 2013 and claims priority to Japanese Patent Application No. 2012-157235 filed on Jul. 13, 2012, the disclosure of which is incorporated herein by reference.

BACKGROUND

The present disclosure relates to an information processing apparatus, an information processing method, and an information processing program for controlling the display of images obtained with microscopes in the field of medical care, pathology, biology, material, or the like.

In the field of medical care, pathology, or the like, there have been proposed systems in which the images of the cells, tissues, organs, or the like of living bodies obtained with optical microscopes are digitized and doctors, pathologists, or the like inspect the tissues or the like or diagnose patients based on the digitized images.

According to a method described in, e.g., Japanese Patent Application Laid-open No. 2009-37250, an image optically obtained with a microscope is digitized by a video camera having CCDs (Charge Coupled Devices) installed therein, and the digital signal is input to a control computer system to visualize the image on a monitor. By viewing the image displayed on the monitor, a pathologist makes an inspection or the like of the image (see, e.g., paragraphs 0027 and 0028 of Japanese Patent Application Laid-open No. 2009-37250)

In addition, as a method of preventing a pathologist from overlooking a pathological image, technology for recording the observation history of the pathological image has been open to the public (e.g., Japanese Patent Application Laid-open No. 2011-112523).

CITATION LIST

Patent Literature

PTL 1: Japanese Patent Application Laid-open No. 2009-37250
PTL 2: Japanese Patent Application Laid-open No. 2011-112523

SUMMARY

Technical Problem

In general, the higher observation magnification, the narrower the observation region of a microscope becomes relative to an entire target. For example, a pathologist often observes a target with a microscope so as to scan the entirety of the target and observes part of the entirety with extremely high magnification to inspect the target. However, if there is a disease in a region of the target not observed by the pathologist under the inspection, i.e., if the pathologist overlooks the region under the inspection, a serious problem may occur afterwards.

The present disclosure has been made in view of the above circumstances, and it is therefore desirable to provide an information processing apparatus, an information processing method, an information processing system, and an information processing program allowing the user to avoid the risk of overlooking a target at observation with a microscope.

Solution to Problem

According to an embodiment, an image processing apparatus is provided comprising a processor and a memory device storing instructions. When executed by the processor, the instructions cause the processor to generate a trail image according to a display time of at least one part of a pathological image in a display region.

In an image processing apparatus according to an embodiment, the trail image is generated by a modification associated with the pathological image according to the display time.

In an image processing apparatus according to an embodiment, the modification is overlaying a mask image on the pathological image according to the display time.

In an image processing apparatus according to an embodiment, the mask image is semi-transparent.

In an image processing apparatus according to an embodiment, a degree of the modification is based on a magnification of the at least one part of the pathological image displayed in the display region.

In an image processing apparatus according to an embodiment, the degree is constant as the display time increases when the magnification is below a threshold. In an image processing apparatus according to an embodiment, the degree increases as the display time increases when the magnification is above a threshold. In an image processing apparatus according to an embodiment, the degree is maintained at a maximum value when the maximum value is reached. In an image processing apparatus according to an embodiment, the degree is increased stepwise based on the display time.

In an image processing apparatus according to an embodiment, at least one of a brightness of the mask image is increased based on the display time and a brightness of the pathological image is decreased based on the display time.

In an image processing apparatus according to an embodiment, the mask image is overlaid on the pathological image using alpha blending.

In an image processing apparatus according to an embodiment, the instructions cause the processor to acquire a display history including the display time of the at least one part of the pathological image.

In an image processing apparatus according to an embodiment, the instructions cause the processor to control display of a thumbnail image of the trail image corresponding to the display history.

In an image processing apparatus according to an embodiment, the image processing apparatus further comprises an input unit configured to receive a user input.

In an embodiment, an image processing method is provided. The image processing method comprising generating a trail image according to a display time of at least one part of a pathological image in a display region.

In an embodiment, a non-transitory computer readable storage medium storing a computer program is provided. The computer program is for causing an image processing apparatus to generate a trail image according to a display time of at least one part of a pathological image in a display region.

In an embodiment, an image processing system is provided. The image processing system comprises a processor and a memory device storing instructions. When executed by the processor, the instructions cause the processor to generate a trail image according to a display time of at least one part of a pathological image in a display region.

In the image processing system according to an embodiment, the image processing system further comprises at least one of a scanner configured to capture the pathological image and a server configured to store the pathological image.

In an embodiment, an image processing apparatus is provided comprising a generation unit configured to generate a trail image according to a display time of at least one part of a pathological image in a display region.

Advantageous Effects of Invention

As described above, according to an embodiment of the present disclosure, it is possible to allow the user to avoid the risk of overlooking a target at observation with a microscope.

Additional features and advantages are described herein, and will be apparent from the following Detailed Description and the figures.

DETAILED DESCRIPTION

Hereinafter, a description will be given of the embodiment of the present disclosure with reference to the drawings.

First Embodiment (Use Environment of Viewer Computer)

Figure 1:
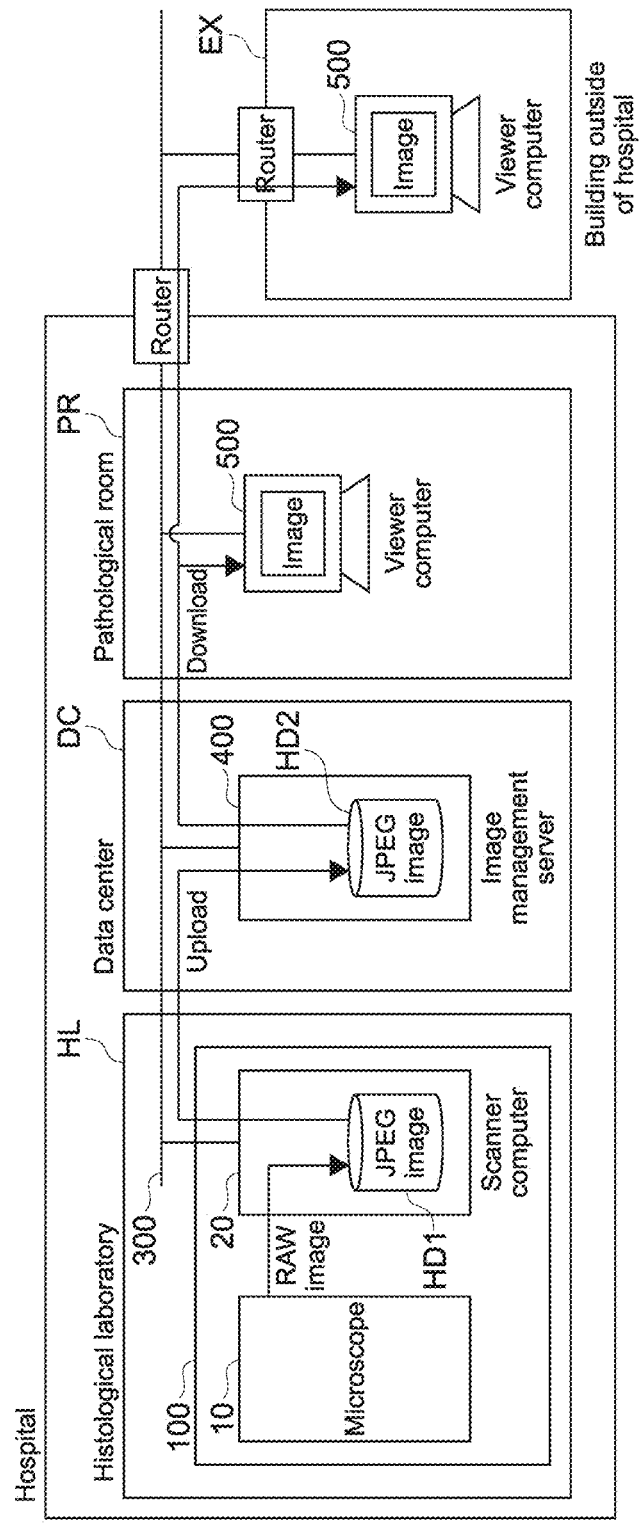
FIG. 1 is a diagram showing the typical use environment of a viewer computer 500 according to an embodiment of the present disclosure.

First, a description will be given of the overview of an environment in which a pathologist diagnoses a virtual slide image (pathological image) taken from a sample with a microscope. The pathologist observes a pathological image using a viewer on a viewer computer to diagnose the image. FIG. 1 is a diagram showing the typical use environment of a viewer computer 500 according to the embodiment of the present disclosure.

A scanner 100 including a microscope 10 and a scanner computer 20 is installed in a histological laboratory HL inside a hospital. A RAW image taken with the microscope 10 is subjected to image processing such as development processing, shading processing, color balance correction, gamma correction, and 8-bit processing on the scanner computer 20. Then, the image is divided into the tiles of 256 (256 pixels and converted into a JPEG (Joint Photographic Experts Group) image for compression. After that, the image is stored on a hard disk HD1.

Next, the JPEG image stored on the hard disk HD1 of the scanner computer 20 is uploaded to a hard disk HD2 on an image management server 400 of a data center DC inside the same hospital via a network 300.

In a pathological room PR inside the hospital or a building EX outside the hospital, the pathologist as an observer uses a viewer computer 500 connected to the image management server 400 via the network 300 to observe the JPEG image stored on the hard disk HD2 of the image management server 400.

In addition, by giving instructions to the viewer computer 500, the pathologist as an observer is allowed to record as a display history a change in the display of the JPEG image made by the pathologist at the observation of the JPEG image. The recorded display history is sent to the image management server 400 via the network 300 and stored there.

Moreover, by giving instructions to the viewer computer 500, the pathologist is allowed to call the display history stored on the image management server 400 and reproduce the previous observation of the JPEG image on the viewer.

(Outline of Embodiment of Present Disclosure)

Next, a description will be given of the outline of the embodiment of the present disclosure. From the past, it has been conducted to superpose and record trails obtained by observing pathological images with the viewer computer 500 on the pathological images as images. However, it has been desired to express locations and time at which the pathologist has observed pathological images on the pathological images as trails in a more understandable manner.

In view of this, as a method of recording trails according to the embodiment of the present disclosure, the trails are recorded in such a manner that a transparent mask image is superposed on an entire pathological image and the transparency of the mask image is changed according to time and observation magnification at which a pathologist displays specific areas. The locations of the trails are recorded (based on the colors of the mask image) with a reduction in the transparency of the displayed areas of the pathological image, and the display time of the areas is expressed by the reduction degree of the transparency (based on the density degrees of the colors of the mask image).

By recording the trails in this manner, the observer is allowed to verify the overlooking of the pathological image later and easily understand the locations and time relevant to the observation of the pathological image.

(Configuration of Viewer Computer 500)

Next, a description will be given of the hardware configuration of the viewer computer 500.

Figure 2:
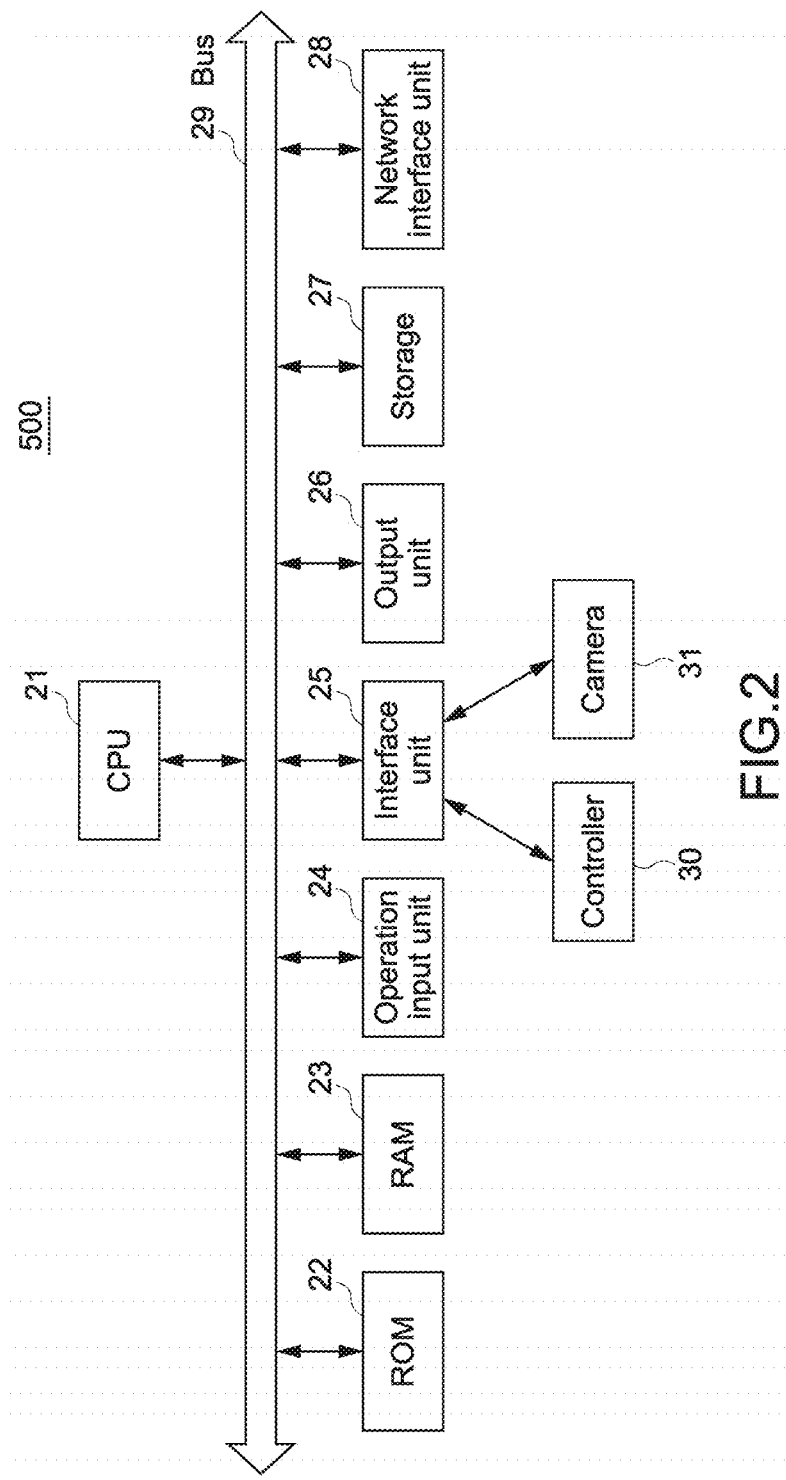
FIG. 2 is a block diagram showing the hardware configuration of the viewer computer 500 according to the embodiment of the present disclosure.

FIG. 2 is a block diagram showing the hardware configuration of the viewer computer 500 according to the embodiment of the present disclosure.

The viewer computer 500 includes a CPU (Central Processing Unit) 21 that performs calculation control, a ROM (Read Only Memory) 22, a RAM (Random Access Memory) 23 that serves as the work memory of the CPU 21, and an operation input unit 24 (input unit) to which instructions according to the operations of the user are input. In addition, the viewer computer 500 includes an interface unit 25, an output unit 26 (display unit), a storage 27, a network interface unit 28, and a bus 29 that connects these units to each other.

The ROM 22 stores therein a program used to execute various processing. The interface unit 25 is connected to a controller 30 and a camera 31. The controller 30 includes various buttons and a stick and is allowed to receive various inputs from the user.

In addition, the controller 30 includes an acceleration sensor and a tilt sensor and is allowed to receive instructions given when the controller 30 is tilted or shaken by the user. The camera 31 is used to take a photograph of the face of the user who observes a pathological image with the viewer computer 500.

The network interface unit 28 is connected to the network 300. As the output unit 26, a liquid crystal display, an EL (Electro Luminescence) display, a plasma display, or the like is used for image display, and a speaker or the like is used for audio output. As the storage 27, a magnetic disk as represented by a HDD (Hard Disk Drive), a semiconductor memory, an optical disk, or the like is used.

The CPU 21 develops into the RAM 23 a program corresponding to instructions given via the operation input unit 24 out of those stored in the ROM 22, the storage 27, or the like and appropriately controls the output unit 26 and the storage 27 according to the developed program.

The CPU 21 implements function blocks that will be described later. The CPU 21 executes the program stored in the ROM 22, the storage 27, or the like to control the above units as occasion demands. Thus, the viewer computer 500 is allowed to implement the various function blocks and cause the above units to operate as the viewer computer 500.

(Configuration of Image Management Server 400)

Next, a description will be given of the hardware configuration of the image management server 400.

The hardware configuration of the image management server 400 is basically the same as that of the viewer computer 500 except that the controller 30 and the camera 31 are not connected to the interface unit 25. For this reason, a detailed description of the hardware configuration of the image management server 400 will be omitted.

(Function Blocks of Image Management Server 400)

Next, a description will be given of the function blocks of the image management server 400. The first primary function of the image management server 400 is to provide a pathological image according to a request from the viewer computer 500. The second primary function of the image management server 400 is to store display histories received from the viewer computer 500 and provide the same according to a request from the viewer computer 500.

Figure 3:
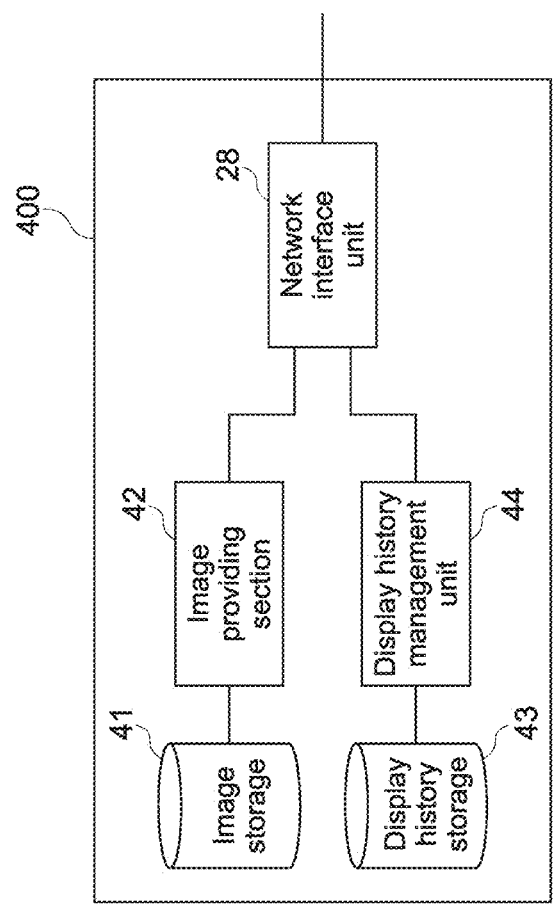
FIG. 3 is a diagram showing the function blocks of an image management server 400.

The third primary function of the image management server 400 is to store a comment (hereinafter referred to as an annotation) on the specific area of a pathological image added by a pathologist on the viewer. FIG. 3 is a diagram showing the function blocks of the image management server 400.

The image management server 400 includes the function blocks of an image storage 41, an image providing section 42, a display history storage 43, and a display history management unit 44.

The image storage 41 stores therein a pathological image divided into tiles and compressed under JPEG. The stored pathological image is provided to the viewer computer 500 via the image providing section 42 according to a request from the viewer computer 500. In addition, an annotation on the pathological image added by the user with the viewer on the viewer computer 500 is also stored in the image storage 41.

The image providing section 42 obtains from the image storage 41 the pathological image corresponding to the image request sent from the viewer computer 500 via the network 300 and sends the same to the viewer computer 500 via the network 300.

The display history storage 43 stores therein the display histories of the viewer operated by the user on the viewer computer 500.

The display history management unit 44 obtains the display histories, which have been recorded on the viewer computer 500 and temporarily put together, via the network 300. Then, the display history management unit 44 stores the obtained display histories in the display history storage 43. Further, upon receiving the display history request from the viewer computer 500, the display history management unit 44 obtains the display history corresponding to the request from the display history storage 43 and sends the same to the viewer computer 500 via the network 300.

Note that since the image management server 400 and the viewer computer 500 build a client/server system each other, the allocation of the functions between the client and the server is a matter of design choice. Therefore, the location at which the functions of the above function blocks are executed is not limited to the image management server 400, but the functions may be executed on the viewer computer 500.

(Function Blocks of Viewer Computer 500)

Next, a description will be given of the function blocks of the viewer computer 500. The first primary function of the viewer computer 500 is to receive operating instructions from the user as a pathologist, obtain a corresponding pathological image from the image management server 400, and shows the image to the user. The second primary function of the viewer computer 500 is to express the display range and the display time of a pathological image as trails on a pathological image and generate a trail image.

The third primary function of the viewer computer 500 is to record the display of an image corresponding to a viewer operation performed by the user to diagnose the image and send the display histories of the image to the image management server 400 for storage. The fourth primary function of the viewer computer 500 is to obtain a display history stored in the image management server 400 according to the request from the user and reproduce the display of an image corresponding to an operation performed by the user based on the display history.

Figure 4:
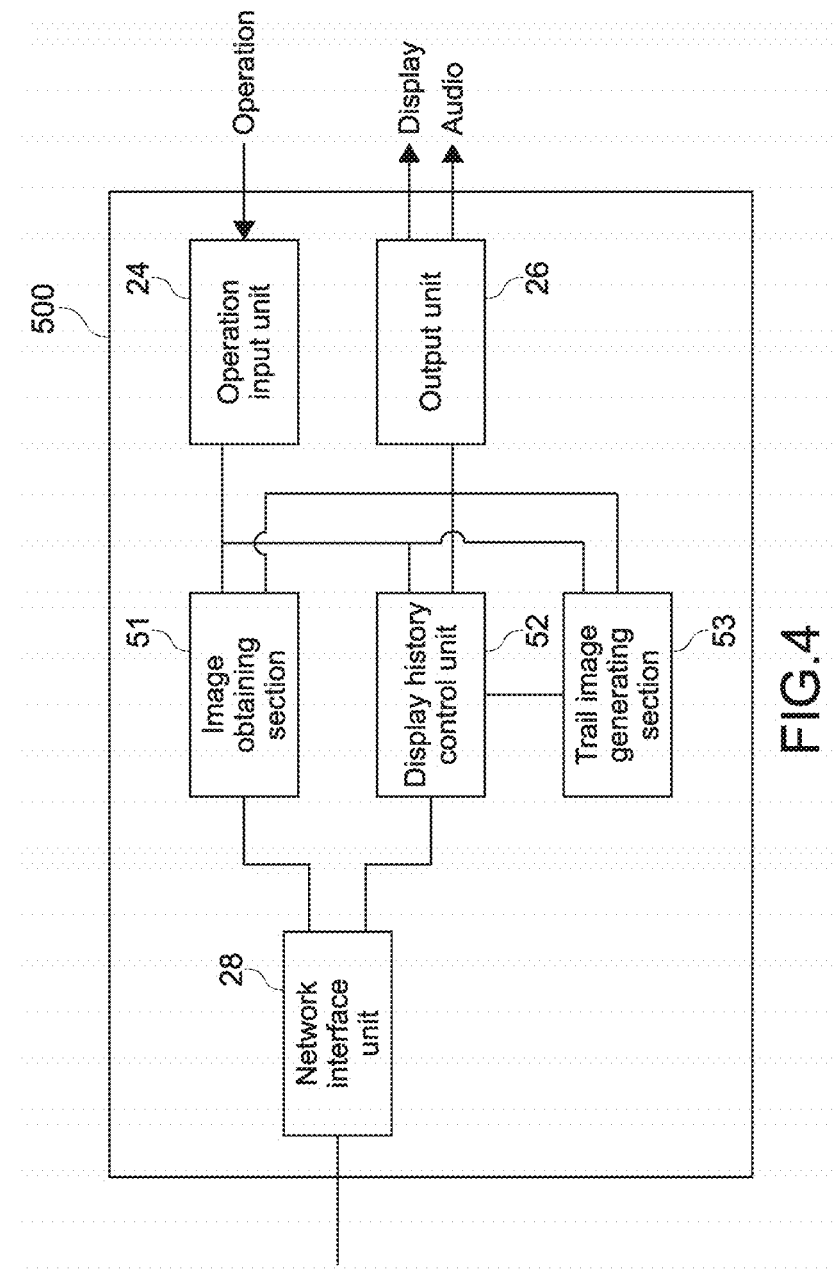
FIG. 4 is a diagram showing the function blocks of the viewer computer 500.

FIG. 4 is a diagram showing the function blocks of the viewer computer 500.

The viewer computer 500 includes the function blocks of an image obtaining section 51 (obtaining section), a display history control unit 52, and a trail image generating section 53 (generating section).

The image obtaining section 51 obtains a pathological image, which corresponds to instructions given by the user as a pathologist via the operation input unit 24, from the image management server 400 via the network 300 and provides the obtained pathological image to the user via the output unit 26.

According to instructions by the user, the display history control unit 52 records changes in screen display corresponding to viewer operations performed by the user to diagnose a pathological image. The changes in screen display are first recorded on the RAM 23 or the storage 27 of the viewer computer 500. Then, according to instructions for stopping the recording, the changes in screen display are put together and sent to the image management server 400 as display histories for storage.

In addition, in response to instructions by the user, the display history control unit 52 obtains a display history corresponding to the instructions from the image management server 400 and provides the screen display of the viewer recorded on the obtained display history to the user via the output unit 26.

Moreover, the display history control unit 52 sends to the trail image generating section 53 information indicating which area of a pathological image has been displayed on the viewer screen and information indicating how long the area of the image has been displayed.

The trail image generating section 53 obtains from the display history control unit 52 location information indicating which area of a pathological image has been displayed and time information indicating how long the area of the image has been displayed, and reduces the transparency of the pixels of a mask image. The details of the reduction of transparency will be described in detail later.

(Viewer Screen)

Figure 5:
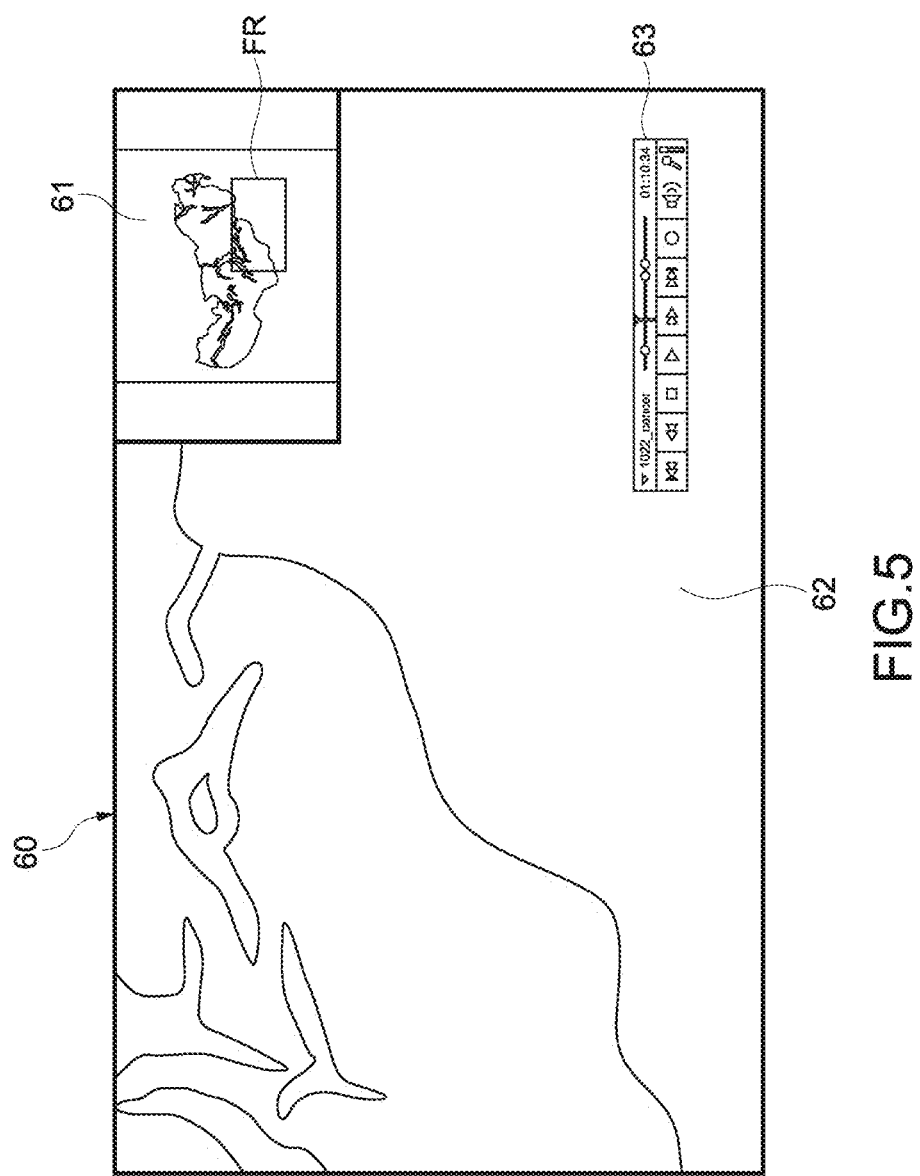
FIG. 5 is a diagram showing an example of a viewer screen.

Next, a description will be given of a viewer screen allowing the user to observe a pathological image on the viewer computer 500. FIG. 5 is a diagram showing an example of the viewer screen.

A viewer window 60 includes a thumbnail map 61 for indicating which area of a pathological image is being enlarged, an observation region 62 for observing the pathological image, and a display recording/reproducing GUI 63. The thumbnail map 61 includes the reduced image of the entire pathological image (hereinafter referred to as the entire pathological image) and a frame FR for equivalently showing on the thumbnail map 61 the range of the image being displayed inside the viewer window 60.

On the thumbnail map 61, the frame FR may be moved in any direction by any distance according to instructions by the user. Note that on the thumbnail map 61, the frame may be moved by the drug operation of a mouse or the like.

The display recording/reproducing GUI 63 receives instructions for starting or stopping the recording of changes in the display screen according to viewer operations performed by the user and sends the received instructions to the display history control unit 52.

(Flow of Recording and Reproducing Display of Viewer Screen)

Figure 6:
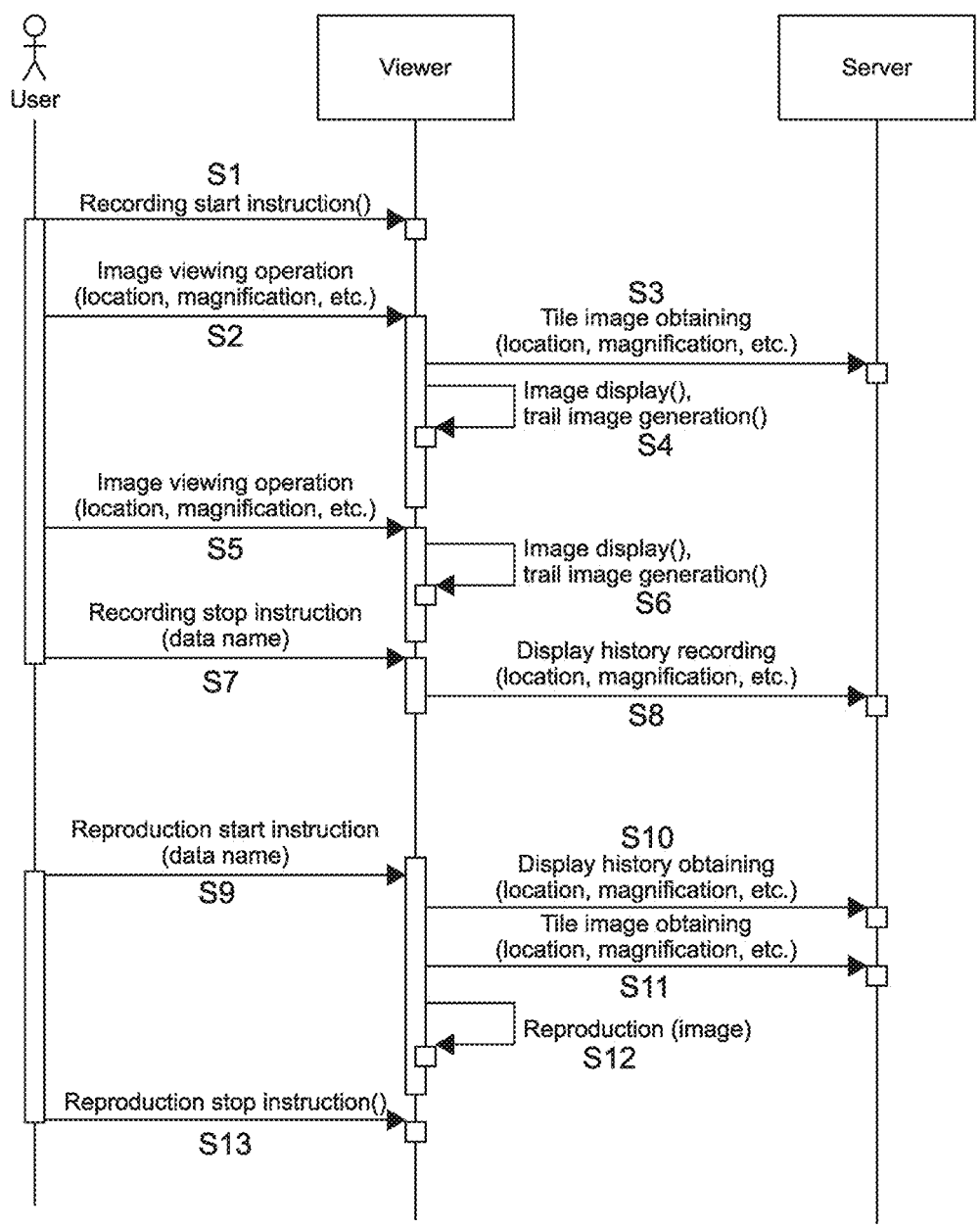
FIG. 6 is a sequence diagram for describing the flow of recording and reproducing the history of a screen display according to viewer operations.

Next, a description will be given of the flow of recording and reproducing the history of screen display according to viewer operations. FIG. 6 is a sequence diagram for describing the flow of recording and reproducing the history of the screen display according to the viewer operations.

To begin with, a description will be given of the flow of recording a display history.

First, the user clicks the recording button of the display recording/reproducing GUI 63 to instruct the display history control unit 52 to start the recording of the display of the viewer (S1). Then, the user selects a pathological image to be observed from a list of pathological images displayed on the viewer.

Upon receiving the instructions for starting the recording, the display history control unit 52 periodically records changes in screen display accompanied by operations by the user to change display locations and observation magnification on the viewer (S2).

With the changes in display range and observation magnification by the user, the image obtaining section 51 makes a request to the image management server 400 for a corresponding tiled image and obtains the image (S3).

The image obtained from the image management server 400 is displayed on the screen via the image obtaining section 51 (S4). At this time, the trail image generating section 53 records the display range of the pathological image in the observation region 62 on the entire pathological image inside the thumbnail map 61, while changing the transparency of a mask image according to the display time and the observation magnification of the pathological image.

The user continuously operates the viewer screen (S5), and the image obtaining section 51 displays the pathological image on the viewer screen (S6). Meanwhile, the display history control unit 52 continuously records the statuses of the screen display as display histories. In addition, the movement trails (including the areas and the time) of the observation region 62 by the trail image generating section 53 are combined with the entire pathological image inside the thumbnail map 61 to be generated as a trail image.

The user clicks the stopping button of the display recording/reproducing GUI 63 to instruct the display history control unit 52 to stop the recording of the viewer display (S7). On this occasion, the recorded display history is given a name. Upon receiving the instructions for stopping the recording, the display history control unit 52 sends the locally temporarily stored display history to the image management server 400 (S8). The display history management unit 44 stores the received display history in the display history storage 43.

The flow of recording a display history is described above. Next, a description will be given of the flow of reproducing a display history.

First, the user selects the name of a display history desired to be reproduced from a list of display histories and clicks the reproducing button of the display recording/reproducing GUI 63 to instruct the display history control unit 52 to reproduce the display history. Note that the list of display histories displays, besides the names of the display histories, trail images corresponding to the display histories as thumbnails.

In response to the instructions for reproducing the display history, the display history control unit 52 makes a request to the display history management unit 44 of the image management server 400 for the display history specified by the user and obtains the display history from the image management server 400 (S10).

In addition, in response to the instructions for reproducing the display history, the image obtaining section 51 obtains an image to be displayed at reproduction from the image storage 41 of the image management server 400 (S11).

Using the display history and the image thus obtained, the display history is reproduced on the viewer screen (S12).

Last, when the user clicks the stopping button of the display recording/reproducing GUI 63 to instruct the display history control unit 52 to stop the reproduction of the display history (S13), the display history control unit 52 stops the reproduction of the display history. The flow of reproducing a display history is described above.

(Alpha Values and Alpha Blending)

Next, a description will be given of the details of the generation of a trail image. First, a description will be given of alpha values and alpha blending used when a mask image is superposed on an entire pathological image displayed within the thumbnail map 61 to express a display trail.

The alpha values represent information items on transparency set in the pixels of digital image data processed by a computer. In addition, the alpha blending represents the combination of two images using coefficients (alpha values). The two images represent, in the case of the embodiment of the present disclosure, an entire pathological image inside the thumbnail map 61 and a mask image set on the near side of the entire pathological image.

Figure 7:
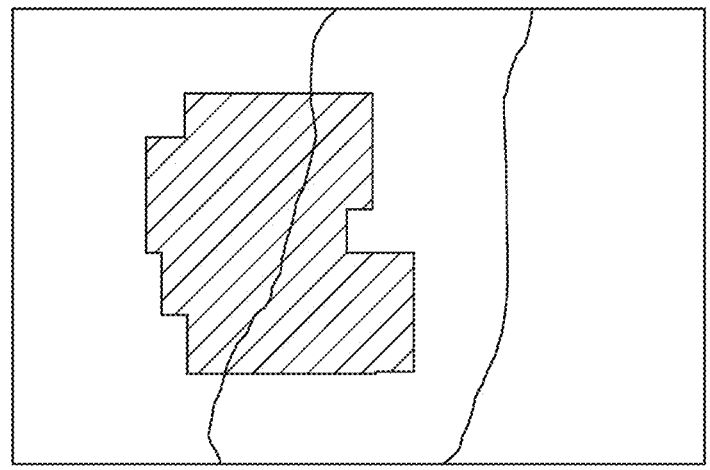
FIG. 7 is a diagram showing a trail image in which an entire pathological image and a display trail are combined together.
Figure 8:
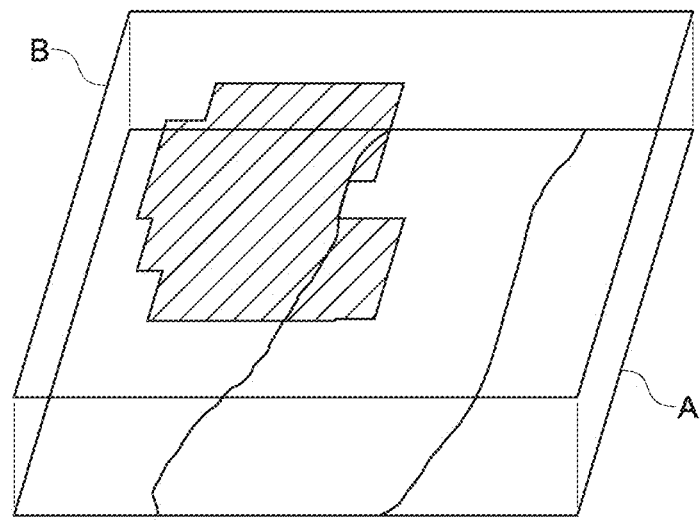
FIG. 8 is a diagram showing a state in which an entire pathological image A and a mask image B different from each other are superposed one on the other.

FIG. 7 is a diagram showing a trail image in which an entire pathological image and a display trail are combined together. FIG. 8 is a diagram showing a state in which an entire pathological image A and a mask image B different from each other are superposed one on the other.

As apparent from these figures, the entire pathological image and the mask image are different from each other. The trail image generating section 53 adjusts alpha values expressing the transparency of the mask image to record a display trail on the mask image. Then, the trail image generating section 53 combines the mask image having the adjusted alpha values with the entire pathological image by the alpha blending to generate a trail image.

The alpha values are integer values in the range of, e.g., zero to 255. If the alpha value of one pixel is zero, the pixel of the mask image becomes completely transparent, resulting in the corresponding pixel of the entire pathological image on the rear side being completely transparent. If the alpha value is 128 or so, the corresponding pixel of the mask image becomes semi-transparent and is colored (e.g., with green). On this occasion, the color of the pixel of the entire pathological image on the rear side is semi-transparent. If the alpha value is 255, the corresponding pixel of the mask image becomes completely opaque, resulting in the color of the entire pathological image on the rear side being completely invisible.

According to the embodiment of the present disclosure, a display trail is recorded in such a manner that a mask image is first made completely transparent, then alpha values are increased with time at which an entire pathological image is displayed in the observation region 62, and the transparency of the mask image is reduced to color the mask image.

Conversely, a display trail may be recorded in such a manner that the transparency of a mask image is first set to 70% or so, alpha values are decreased with time at which an entire pathological image is displayed in the observation region 62, and the transparency of the mask image is increased to decolor the mask image.

Note that since a mask image is different from an entire pathological image, it is also possible to reset the recording of a trail with the restoration of all the alpha values to zero.

(Method of Adding Alpha Values (Basics))

According to the embodiment of the present disclosure, redrawing is repeatedly performed at a frame rate of, e.g., 60 fps as in the reproduction of moving pictures such that at least part of a pathological image is displayed in the observation region 62. The same applies to the display of the thumbnail map 61. Under such conditions, in order to continuously display, e.g., a certain range of the pathological image, it is assumed to increase alpha values by one for every frame. In this manner, the alpha values of the pixels of a mask image corresponding to a location at which the pathological image is displayed in the observation region become 60 as time (one second) elapses for 60 frames, resulting in the mask image being opaque by 23%.

If the display time elapses for four seconds in this state, the alpha values reach 255, resulting in the mask image being completely opaque. In this case, since the entire pathological image on the rear side is invisible, the user has a difficulty in understanding which area of the pathological image has been observed based on the comparison between the shape of the entire pathological image and a display trail. In order to address this problem, it is desirable to set ceilings on the alpha values. If the ceilings of the added alpha values are set to 180, the increase of the alpha values is stopped when the transparency of the mask image becomes 70% or so. Therefore, the invisibility of the entire pathological image on the rear side is prevented.

Note that in the above example, the alpha values are increased by one for every frame. However, the alpha values may be increased by one for every, e.g., 30 seconds. In this manner, it takes 90 minutes until the alpha values reach their ceilings, i.e., 180. Therefore, in a case in which the observation of a pathological image for a long period of time is recorded, the transparency is made different depending on time whereby the appropriate recording of a display trail is allowed. In either case, the increasing rates of the alpha values may be set according to the typical length of observation time.

(Method of Adding Alpha Values (Considering Observation Magnification))

In the above configuration, the alpha values are increased unconditionally in a case in which a certain range of the pathological image is continuously displayed in the observation region 62. However, it is also assumed that the increasing rates of the alpha values are made different depending on observation magnification at which the pathological image is observed. If it is intended to express the observation frequency of a pathological image in proportion to the density of the color of a trail in a trail image (in proportion to the opacity of a mask image), it is desirable to increase the opacity in proportion to observation time at a certain area. Similarly, since higher observation magnification represents detailed observation, it is desirable to increase the increasing rates of the alpha values.

If the observation magnification is set to, e.g., less than two times, the increasing amounts of the alpha values per unit time are set to zero and no trail is recorded. If the observation magnification is set to two times or more and less than four times, the increasing amounts of the alpha values per unit time are set to one. If the observation magnification is set to four times or more, the increasing amounts of the alpha values per unit time are set to two. With the above configuration, the recording of a display trail is allowed considering the observation magnification.

Figure 9A:
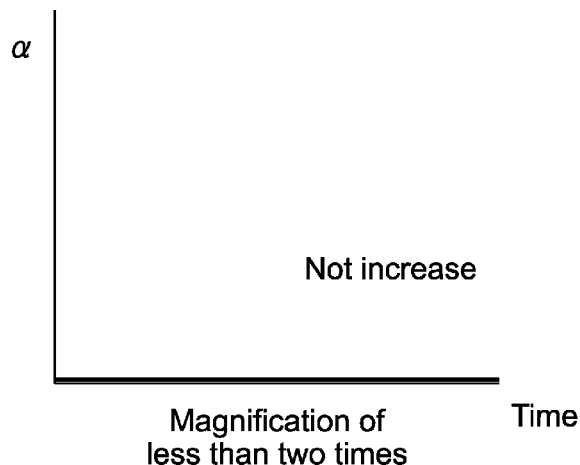
FIGS. 9A to 9C are graphs showing the increasing tendency of alpha values.
Figure 9B:
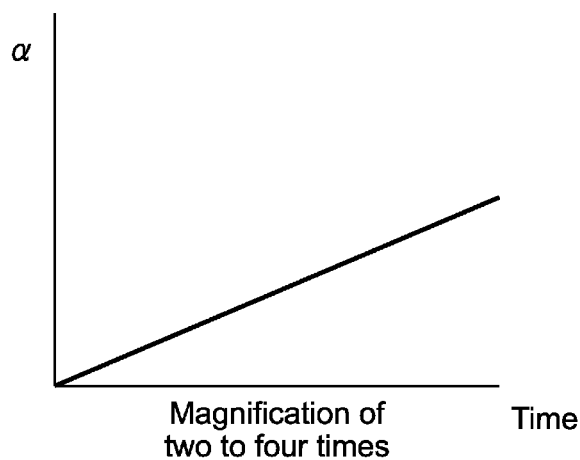
Figure 9C:
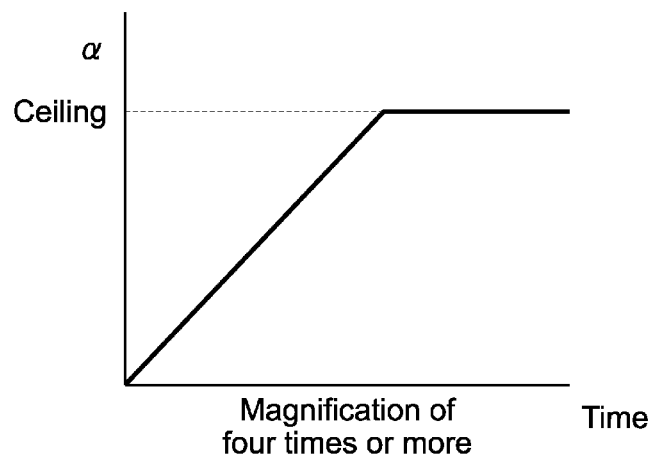

FIGS. 9A to 9C are graphs showing the increasing tendency of the alpha values based on the above configuration. As shown in FIG. 9A, if the observation magnification is set to less than two times, the alpha values remain zero regardless of the elapse of time. As shown in FIG. 9B, if the observation magnification is set to two times or more and less than four times, the alpha values are gently increased. As shown in FIG. 9C, if the observation magnification is set to four times or more, the alpha values are rapidly increased but are no longer increased after reaching their ceilings as described above.

(Method of Adding Alpha Values (Considering Observation Time))

In the above configuration, the alpha values are monotonously increased when a certain area is continuously observed. However, the observation of a certain area for a long period of time indicates that the area is observed in detail in proportion to the time. On this occasion, it is desirable to increase the increasing rates of the alpha values.

Figure 10:
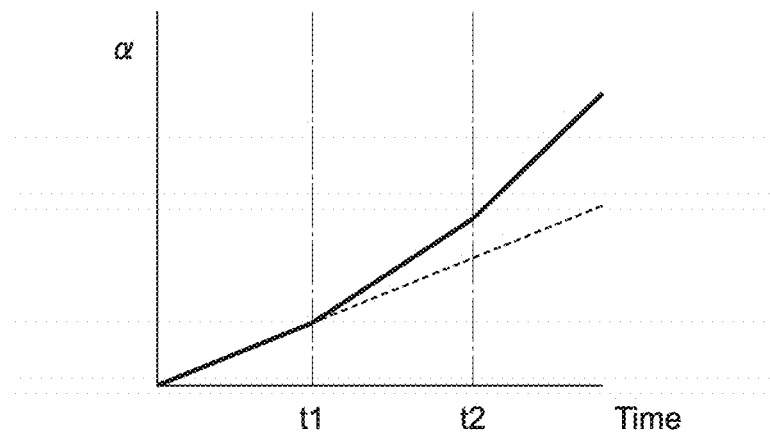
FIG. 10 is a graph showing a state in which the increasing rates of the alpha values are changed when a certain location is observed for a long period of time.

FIG. 10 is a graph showing a state in which the increasing rates of the alpha values are changed when a certain area is observed for a long period of time. For example, the alpha values are increased by n per unit time until time t1 elapses after observation is started with a certain area displayed in the observation region 62. As the time t1 elapses, the increasing rates of the alpha values are increased by 1.1 times to be 1.1 n.

As time t2 elapses in a state in which the same area is continuously observed, the increasing rates of the alpha values are increased by 1.2 times to be 1.2 n per unit time. As described above, the value of n fluctuates according to the observation magnification. When the image displayed in the observation region 62 is moved, the increasing rates of the alpha values are reset to n.

With the above configuration, the trail of the observation of a certain area for a long period of time may be emphatically recorded.

(Recording Method for Rotation Display)

Figure 11:
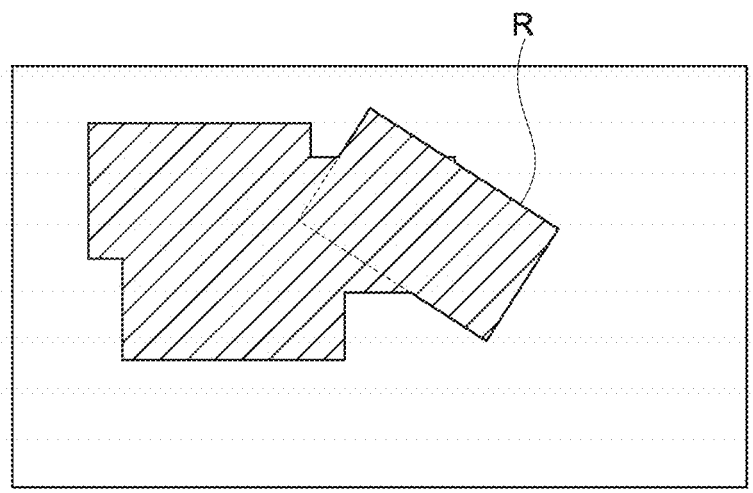
FIG. 11 is a diagram showing an example in which recording is performed on a mask image with a rectangle R corresponding to an observation region 62 rotated.

Next, a description will be given of a recording method in a case in which an image is rotated when part of the pathological image is displayed in the observation region 62. Basically, the alpha values of pixels in a rectangle region corresponding to the observation region 62 are only increased as in a case in which the image is not rotated. However, in order to reflect the rotation, recording is performed on a mask image with the rectangle corresponding to the observation region 62 rotated. FIG. 11 is a diagram showing an example in which recording is performed on a mask image with a rectangle R corresponding to the observation region 62 rotated.

(Flow of Generating Trail Image)

Figure 12:
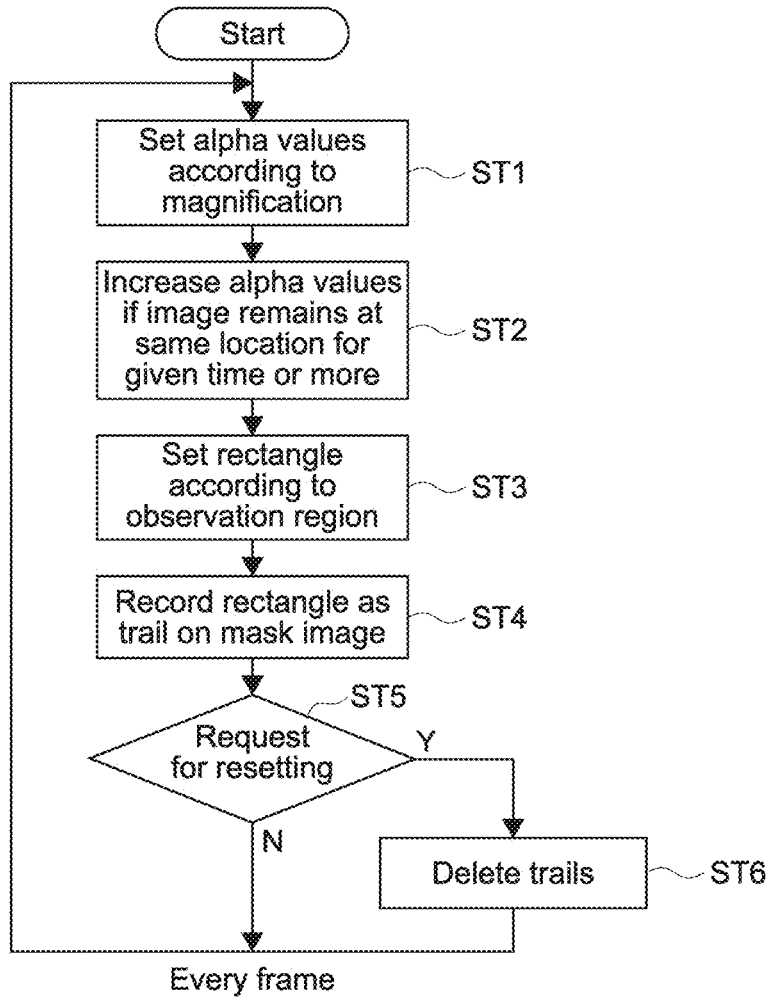
FIG. 12 is a flowchart for describing the flow of processing for generating a trail image.

Next, a description will be given of the flow of processing by the trail image generating section 53 for generating a trail image. FIG. 12 is a flowchart for describing the flow of processing for generating a trail image. Note that since a trail image is updated for every frame (one frame for 60 seconds in the case of, e.g., 60 fps) as described above, the processing of the flowchart is also performed based on the timing for every frame.

First, the trail image generating section 53 sets alpha values according to current observation magnification (step ST1).

Next, the trail image generating section 53 determines whether certain time has elapsed since the display of a current image in the observation region 62 and increases the alpha values if the certain time has elapsed (step ST2).

Then, according to the range of the image displayed in the observation region 62, the trail image generating section 53 sets the range of a rectangle to change the alpha values on a mask image (step ST3).

Next, the trail image generating section 53 records the rectangle as a trail on the mask image (step ST4). Here, recording is performed in such a manner that the increase of the alpha values set in step ST1 or ST2 is added to the alpha values of target pixels on the mask image. After the recording, the rectangle indicating the range of the observation region 62 is displayed on an entire pathological image on the thumbnail map 61 by the color of the mask image.

Then, the trail image generating section 53 determines whether a request for resetting display trails has been received from the operation input unit 24 and deletes, if the request has been received (Yes in step ST5), all the trails on the thumbnail map 61 (step ST6). In this case, the trail image generating section 53 resets the alpha values of all the pixels of the mask image to their initial values to delete all the trails.

The flow of the processing for generating a trail image by the trail image generating section 53 is described above.

(Actual Example of Trail Image)

Next, a description will be given of an actual example of a trail image generated by the trail image generating section 53 on the thumbnail map 61.

In the following, a description will be first given of an example in which the user observes a pathological image with the allocation of time. Then, a description will be given of an example in which trails corresponding to the observation are displayed according to the densities of colors.

Figure 13:
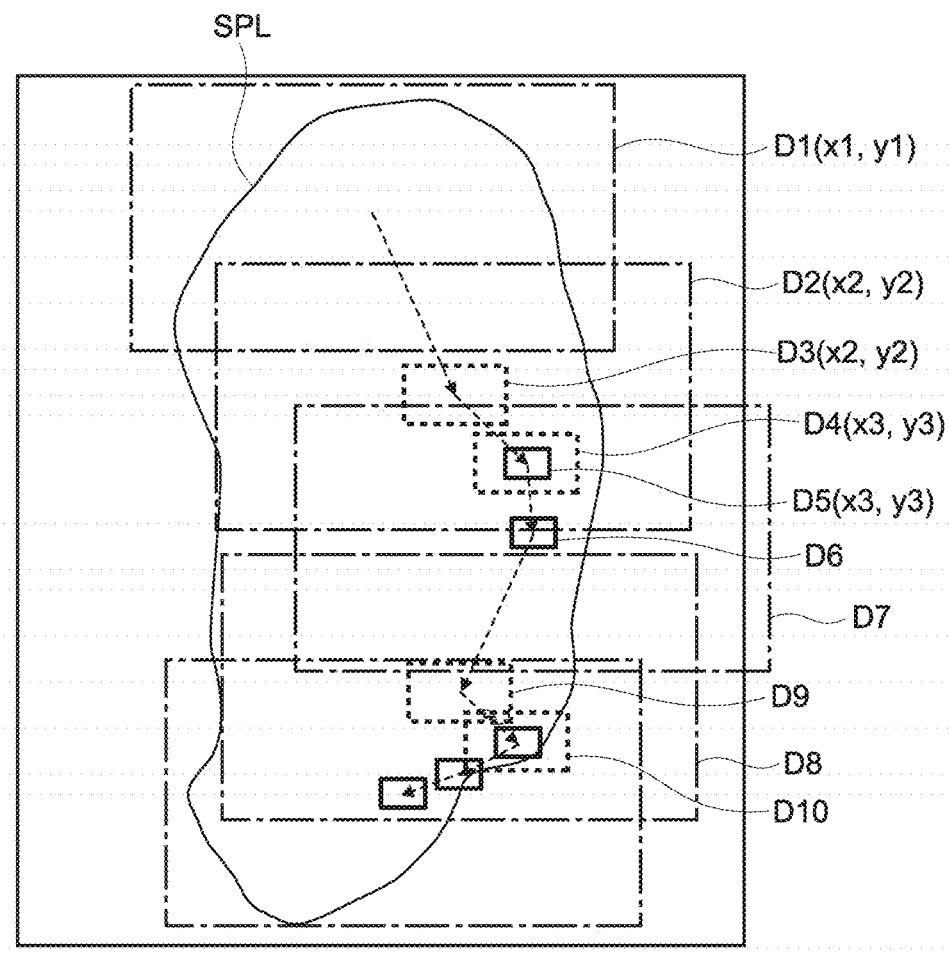
FIG. 13 is a diagram showing processes in which the user causes a taken sample SPL to be displayed in the observation region 62 to view the sample SPL.
Figure 14:
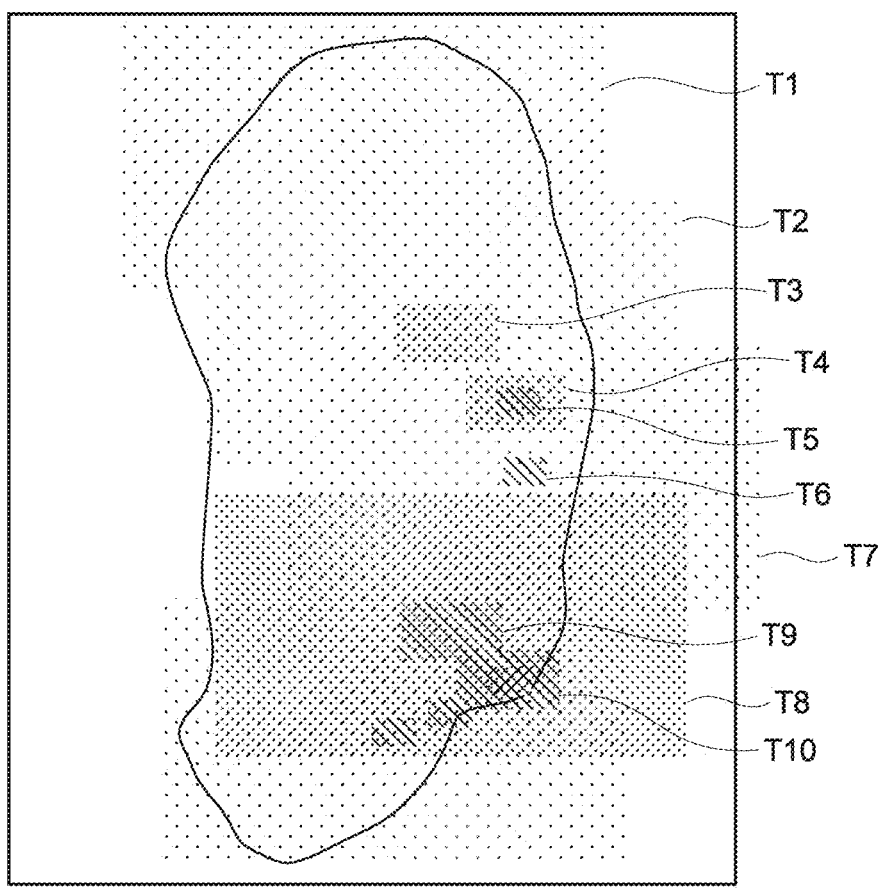
FIG. 14 is a diagram showing an example in which the display processes shown in FIG. 13 are recorded as a display trails on an entire pathological image inside a thumbnail map 61.

FIG. 13 is a diagram showing processes in which the user causes a taken sample SPL to be displayed in the observation region 62 to view the sample SPL. FIG. 14 is a diagram showing an example in which the display processes are recorded as display trails on an entire pathological image inside the thumbnail map 61.

A description will be given, with reference to FIG. 13, of a manner as to how the user causes the pathological image to be displayed in the observation region 62.

First, the user causes the range of an upper part D1 of the sample SPL to be displayed as a partial image in the observation region 62 at an observation magnification of 1.25 times to observe the range for eight seconds. Note that the center of the display range D1 is placed at coordinates (x1, y1).

Next, the user causes the display range of the partial image to be changed from D1 to D2 to observe the display range D2 for 20 seconds. The center of the display range D2 of the partial image is placed at coordinates (x2, y2).

Then, the user enlarges the observation magnification from 1.25 times to 20 times and causes the display range D3 of the partial image to be displayed to observe the display range D3 for 35 seconds. On this occasion, the center of the partial image remains at the coordinates (x2, y2).

Next, the user causes the display range D3 of the partial image to be moved to the display range D4 to observe the display range D4 for 40 seconds. The center of the partial image is placed at coordinates (x3, y3).

Then, the user enlarges the observation magnification from 20 times to 40 times and causes the display range D5 of the partial image to be displayed to observe the display range D5 for two minutes. On this occasion, the center of the partial image remains at the coordinates (x3, y3).

In the same manner as the above, the user changes the observation magnification and the observation time to perform the observation.

Next, a description will be given, with reference to FIG. 14, of an example of recording the display trails of the above observation processes.

The trails T1, T2, T7, and the like in which the partial image has been observed at low magnification for a short period of time are recorded using light colors such that they have high transparency. Conversely, the trails T5, T9, T10, and the like are expressed using the densest colors such that their opaque degrees are the highest. In particular, since the trail T5 and the like are expressed using the cumulated densities of the color of the trail T2, the color of the trail T4, and the original color of the trail T5, they are recorded using the extremely dense colors.

(Application (Display with Threshold))

Next, a description will be given of an example of setting a threshold in a trail image and displaying the trail image.

As described above, the alpha values of a mask image are consecutive values gradually increased from zero. Therefore, when displayed on a trail image, the mask image are expressed by the gradation of colors, resulting in a difficulty in discriminating which area of the image has been observed by an observer.

In view of this, in a state in which a certain threshold is set in advance, the alpha values are maximized such that the mask image becomes completely opaque if the alpha values are the threshold value or more. On the other hand, the alpha values are minimized such that the mask image becomes completely transparent if the alpha values are less than the threshold. Thus, the mask image is converted from an image having the gradation of colors to a binary image, thereby making it possible to facilitate the discrimination between observed areas and unobserved areas.

Note that in the above description, the alpha values are maximized such that the trails become completely opaque. However, it may also be possible to set the alpha values to values smaller than the maximum values as their maximum values.

Figures 15, 16:
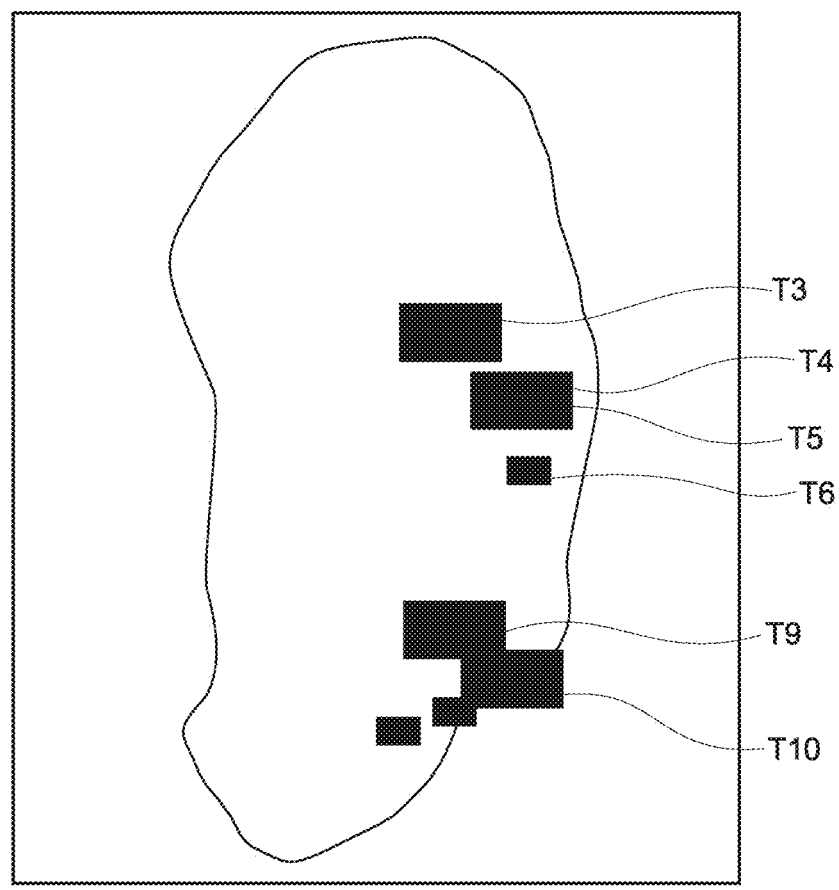
FIG. 15 is a diagram showing an example of the trail image combined with the mask image converted into a binary image.
FIG. 16 is a diagram showing an example of the screen of the list of display histories provided to the user by a display history control unit 52.

FIG. 15 is a diagram showing an example of the trail image combined with the mask image converted into the binary image. Since the trails T3, T4, T5, T6, T9, T10, and the like are expressed using opaque colors, it is possible to quickly understand which parts of the image have been frequently observed.

(Application (Using Thumbnail of Trail Image))

Next, when the user selects a display history desired to be reproduced from among those stored in the image management server 400, it is assumed as an application of a trail image that the trail image may be used as the thumbnail of each display history displayed in a list.

FIG. 16 is a diagram showing an example of the screen of the list of display histories provided to the user by the display history control unit 52. Each row represents one display history and displays the thumbnail of a trail image, the name of a display history, and recording time from the left side thereof.

In this example, it is worthy of note that the locations of trails are indicated inside the thumbnails. If the thumbnails are not available, the user has a difficulty in searching for a desired display history based on a corresponding display history name and recording time. Conversely, if the thumbnails of trail images are available, the user is allowed to quickly understand the correspondence relationship between a display history and an observation location of a pathological image.

In order to use the trail images having the observed areas of the pathological image recorded thereon as the thumbnails at the provision of the list of the display histories as described above, it is useful to store the trail images as the attribute information items of the display histories so as to be associated.

(Other Configurations of Present Disclosure)

Additionally, the present technology may also be configured as below.

(1)

An image processing apparatus comprising a processor; and a memory device storing instructions which when executed by the processor, causes the processor to: generate a trail image according to a display time of at least one part of a pathological image in a display region.

(2)

The image processing apparatus according to (1), wherein the trail image is generated by a modification associated with the pathological image according to the display time.

(3)

The image processing apparatus according to (2), wherein the modification is changing a brightness of the pathological image according to the display time.

(4)

The image processing apparatus according to (2), wherein the modification is overlaying a mask image on the pathological image according to the display time.

(5)

The image processing apparatus according to (2), wherein a degree of the modification is based on a magnification of the at least one part of the pathological image displayed in the display region.

(6)

The image processing apparatus according to (5), wherein the degree is constant as the display time increases when the magnification is below a threshold.

(7)

The image processing apparatus according to (5) or (6), wherein the degree increases as the display time increases when the magnification is above a threshold.

(8)

The image processing apparatus according to (5), (6), or (7), wherein the degree is maintained at a maximum value when the maximum value is reached.

(9)

The image processing apparatus according to (5), (6), (7), or (8), wherein the degree is increased stepwise based on the display time.

(10)

The image processing apparatus according to (4), wherein at least one of a brightness of the mask image is increased based on the display time and a brightness of the pathological image is decreased based on the display time.

(11)

The image processing apparatus according to (4) or (10), wherein the mask image is overlaid on the pathological image using alpha bending.

(12)

The image processing apparatus according to (1), (2), (3), (4), (5), (6), (7), (8), (9), (10), or (11), wherein the instructions cause the processor to: acquire a display history including the display time of the at least one part of the pathological image.

(13)

The image processing apparatus according to (12), wherein the instructions cause the processor to control display of a thumbnail image of the trail image corresponding to the display history.

(14)

The image processing apparatus according to (1), (2), (3), (4), (5), (6), (7), (8), (9), (10), (11), (12), or (13), further comprising an input unit configured to receive a user input.

(15)

An image processing method comprising generating a trail image according to a display time of at least one part of a pathological image in a display region.

(16)

A non-transitory computer readable storage medium storing a computer program for causing an image processing apparatus to generate a trail image according to a display time of at least one part of a pathological image in a display region.

(17)

An image processing system comprising a processor; and a memory device storing instructions which when executed by the processor, causes the processor to generate a trail image according to a display time of at least one part of a pathological image in a display region.

(18)

The image processing system according to (17), further comprising a scanner configured to capture the pathological image.

(19)

The image processing system according to claim 17, further comprising a server configured to store the pathological image.

(20)

A image processing apparatus comprising a generation unit configured to generate a trail image according to a display time of at least one part of a pathological image in a display region.

(21)

The image processing apparatus according to (3), wherein the mask image is semi-transparent.

(22)

An information processing apparatus, including:
an obtaining section configured to obtain a pathological image;
a display unit configured to display at least part of the obtained pathological image as a partial display region;
an input unit configured to receive instructions for moving the partial display region from a user; and
a generating section configured
to generate at a fixed time period a combination image in which a value corresponding to a length of display time of the partial display region is provided for each location of all pixels in the displayed partial display region, and
to cumulatively combine the combination image with the pathological image to generate a trail image indicating a trail of a movement of a range displayed as the partial display region.

(23) The information processing apparatus according to (22), in which the generating section is configured to correct the value corresponding to the length of the display time of the range according to a degree of observation magnification and generate the combination image at the fixed time period.

(24) The information processing apparatus according to (22) or (23), in which the generating section is configured to increase, if the display range of the partial display region is fixed, a brightness value of a trail color expressing the trail of the trail image for each location of all the pixels in the displayed partial display region with an increase in the display time to decrease a brightness value of the pathological image.

(25) The information processing apparatus according to (24), in which the generating section is configured to gradually increase an increasing rate of the brightness value of the trail color if the display range of the partial display region is fixed and the display time exceeds given time.

(26) The information processing apparatus according to (24) or (25), in which, for each location of all the pixels of the trail image,
the generating section is configured
to express a color of each of the pixels of the trail image only with the trail color if the brightness value of the trail color is a given threshold or more and,
to express the color of each of the pixels of the trail image only with a color of the pathological image if the brightness value is less than the threshold.

(27) The information processing apparatus according to any one of (22) to (26), in which
the generating section is configured
to use an alpha value as the value, and
to use alpha blending as a combination method for each of the pixels.

(28) The information processing apparatus according to any one of (22) to (27), in which
the generating section is configured to add the trail image as a thumbnail to a display history in which at least location information on the partial display region in the pathological image is periodically recorded in association with the display time of the partial display region.

(29) An information processing method, including:
obtaining a pathological image, by an obtaining section;
displaying at least part of the obtained pathological image as a partial display region, by a display unit;
receiving instructions for moving the partial display region from a user, by an input unit; and
generating at a fixed time period a combination image in which a value corresponding to a length of display time of the partial display region is provided for each location of all pixels in the displayed partial display region and cumulatively combining the combination image with the pathological image to generate a trail image indicating a trail of a movement of a range displayed as the partial display region, by a generating section.

(30) An information processing program causing a computer to function as:
an obtaining section configured to obtain a pathological image;
a display unit configured to display at least part of the obtained pathological image as a partial display region;
an input unit configured to receive instructions for moving the partial display region from a user; and
a generating section configured
to generate at a fixed time period a combination image in which a value corresponding to a length of display time of the partial display region is provided for each location of all pixels in the displayed partial display region, and
to cumulatively combine the combination image with the pathological image to generate a trail image indicating a trail of a movement of a range displayed as the partial display region.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

Microscope
20 Scanner computer
21 CPU
22 ROM
23 RAM
24 Operation input unit
25 Interface unit
26 Output unit
27 Storage
28 Network interface unit
29 Bus
30 Controller
31 Camera
41 Image storage
42 Image providing section
43 Display history storage
44 Display history management unit
51 Image obtaining section
52 Display history control unit
53 Trail image generating section
60 Viewer window
61 Thumbnail map
62 Observation region
63 Display recording/reproducing GUI
100 Scanner
300 Network
400 Image management server
500 Viewer computer

The invention claimed is:

1. A method of displaying a microscopic image, the method comprising:
- causing a display device to display a first area and a second area of the microscopic image, wherein the first area of the microscopic image is configured to be displayed in a first resolution and the second area of the microscopic image is configured to be displayed in a second resolution,
- causing the display device to display a first part of the first area in a first color different from an intrinsic color of the microscopic image in a case that a magnification of the second area is a first threshold value or more; and
- causing the display device to display the first part of the first area in the same color as before in a case that the magnification of the second area is less than the first threshold value,
- wherein the first part of the first area corresponds to the second area of the microscopic image, and
- wherein the first color includes one or more colors.

2. The method of claim 1, wherein the microscopic image is at least one of a medical image, a pathological image or a biological image.

3. The method of claim 1, wherein the microscopic image includes at least one of a cell, a tissue, or an organ.

4. The method of claim 1, wherein the first color is variable depending on a magnification level of the second area of the microscopic image.

5. The method of claim 4, wherein the first color increases intensity as the magnification level of the second area of the microscopic image increases.

6. The method of claim 4, wherein the first color transparency is variable depending on the magnification level of the second area of the microscopic image.

7. The method of claim 1, wherein the first color is variable depending on a time that the second area of the microscopic image was displayed.

8. The method of claim 7, wherein the first color increases intensity as the time that the second area of the microscopic image was displayed is passed.

9. The method of claim 1, wherein the first part of the first area is displayed in the first color after displaying the second area of the microscopic image for a predetermined period of time.

10. The method of claim 9, wherein the first part of the first area is displayed in an intrinsic color of the microscopic image until the second area of the microscopic image has been displayed for the predetermined period of time.

11. An apparatus comprising:
a processor configured to:
- cause a display device to display a first area and a second area of a microscopic image, wherein the first area of the microscopic image is configured to be displayed in a first resolution and the second area of the microscopic image is configured to be displayed in a second resolution,
- cause the display device to display a first part of the first area in a first color different from an intrinsic color of the microscopic image in a case that a magnification of the second area is a first threshold value or more; and
- cause the display device to display the first part of the first area in the same color as before in a case that the magnification of the second area is less than the first threshold value,
- wherein the first part of the first area corresponds to the second area of the microscopic image, and
- wherein the first color includes one or more colors.

12. The apparatus of claim 11, wherein the microscopic image is at least one of a medical image, a pathological image or a biological image.

13. The apparatus of claim 11, wherein the microscopic image includes at least one of a cell, a tissue, or an organ.

14. The apparatus of claim 11, wherein the first color is variable depending on a magnification level of the second area of the microscopic image.

15. The apparatus of claim 14, wherein the first color increases intensity as the magnification level of the second area of the microscopic image increases.

16. The apparatus of claim 14, wherein the first color transparency is variable depending on the magnification level of the second area of the microscopic image.

17. The apparatus of claim 11, wherein the first color is variable depending on a time that the second area of the microscopic image was displayed.

18. The apparatus of claim 17, wherein the first color increases intensity as the time that the second area of the microscopic image was displayed is passed.

19. The apparatus of claim 11, wherein the first part of the first area is displayed in the first color after displaying the second area of the microscopic image for a predetermined period of time.

20. The apparatus of claim 19, wherein the first part of the first area is displayed in an intrinsic color of the microscopic image until the second area of the microscopic image has been displayed for the predetermined period of time.

21. A system comprising:
- a scanner configured to capture a microscopic image and generate image data representing the microscopic image; and
- a memory storing executable user code which, when read, causes processing circuitry to:
- cause a display device to display a first area and a second area of the microscopic image, wherein the first area of the microscopic image is configured to be displayed in a first resolution and the second area of the microscopic image is configured to be displayed in a second resolution,
- cause the display device to display a first part of the first area in a first color different from an intrinsic color of the microscopic image in a case that a magnification of the second area is a first threshold value or more; and
- cause the display device to display the first part of the first area in the same color as before in a case that the magnification of the second area is less than the first threshold value,
- wherein the first part of the first area corresponds to the second area of the microscopic image, and
- wherein the first color includes one or more colors.

22. The system of claim 21, wherein the microscopic image is at least one of a medical image, a pathological image or a biological image.

23. The system of claim 21, wherein the microscopic image includes at least one of a cell, a tissue, or an organ.

24. The system of claim 21, wherein the first color is variable depending on a magnification level of the second area of the microscopic image.

25. The system of claim 24, wherein the first color increases intensity as the magnification level of the second area of the microscopic image increases.

26. The system of claim 24, wherein the first color transparency is variable depending on the magnification level of the second area of the microscopic image.

27. The system of claim 21, wherein the first color is variable depending on a time that the second area of the microscopic image was displayed.

28. The system of claim 27, wherein the first color increases intensity as the time that the second area of the microscopic image was displayed is passed.

29. The system of claim 21, wherein the first part of the first area is displayed in the first color after displaying the second area of the microscopic image for a predetermined period of time.

30. The system of claim 29, wherein the first part of the first area is displayed in an intrinsic color of the microscopic image until the second area of the microscopic image has been displayed for the predetermined period of time.

* * * * *